United States Patent [19]

Colardelle et al.

[11] 3,778,734

[45] Dec. 11, 1973

[54] CURRENT-LIMITED GYRATOR

[75] Inventors: Joel Serge Colardelle, Creteil; Claude Paul Henri Lerouge, Maurepas; Marc Andre Regbuer, Aulnay-sous-bois, all of France

[73] Assignee: International Standard Electric Corporation, New York, N.Y.

[22] Filed: Aug. 2, 1972

[21] Appl. No.: 277,429

[52] U.S. Cl. ................ 333/80 T, 307/295, 307/297

[51] Int. Cl. ........................ H03h 11/00, H03h 7/44

[58] Field of Search .................. 333/80 T; 307/237, 307/295, 297

[56] References Cited

UNITED STATES PATENTS

| | | | |
|---|---|---|---|
| 2,973,439 | 2/1961 | Wright | 307/237 |
| 3,042,838 | 7/1962 | Bedford et al. | 307/237 X |
| 2,801,346 | 7/1957 | Rongen et al. | 333/80 T UX |

*Primary Examiner*—Paul L. Gensler
*Attorney*—C. Cornell Remsen, Jr. et al.

[57] ABSTRACT

There is described a current-limited gyrator having only two terminals. The gyrator includes a first transistor to supply a load, the base of the first transistor being coupled to its emitter circuit through a capacitor. A second transistor is coupled to the first transistor to limit the current supplied to the load by modifying the bias of the first transistor when the current to the load exceeds a predetermined value.

1 Claim, 7 Drawing Figures

CURRENT-LIMITED GYRATOR

SUMMARY OF THE INVENTION

The present invention relates to a current-limited active gyrator circuit or "supply dipole" which comprises only two terminals and which assumes the following functions. (1) function of "gyration", that is to say, the transformation of a capacitance into a virtual inductance appearing between the two terminals; (2) supply of a current to an external load which appears to be connected in series with the virtual inductance; and (3) limiting the current flowing through the load.

There are many applications of such a circuit, and in particular for use in the power supply of electronic circuits. The current-limited gyrator of the present invention enables achieving (1) filter systems having a series inductance input wherein the value of the virtual inductance can reach several henrys even when using a capacitor with a relatively low value; and (2) power supplies stabilized by a Zener diode wherein the resistor which feeds the Zener diode is replaced by said gyrator.

In both cases, the current-limited gyrator provides a better filtering and a protection against the short circuits on the load. It should be noted that these advantages may be combined with a low value of D.C. resistance if required.

The object of the present invention is, therefore, to provide a current-limited gyrator comprising only two terminals.

A feature of the present invention is the provision of a gyrator comprising: a first terminal; a second terminal; a first transistor of a given type having a base, an emitter and a collector, the collector being directly connected to the first terminal; a first resistor directly connected between the first terminal and the base of the first transistor; a power supply source directly connected to the first terminal; a second resistor directly connected to the emitter of the first transistor; a third resistor directly connected in series between the second resistor and the second terminal; a capacitor directly connected between the base of the first transistor and the second terminal; and a load circuit directly connected to the second terminal.

A further feature of the present invention is the provision of the above defined gyrator further including a second transistor of a type equal to the given type having a base, an emitter and a collector, the base of the second transistor being directly connected to the junction between the second and third resistors, the emitter of the second transistor being directly connected to the second terminal and the collector of the second transistor being directly connected to the base of the first transistor.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
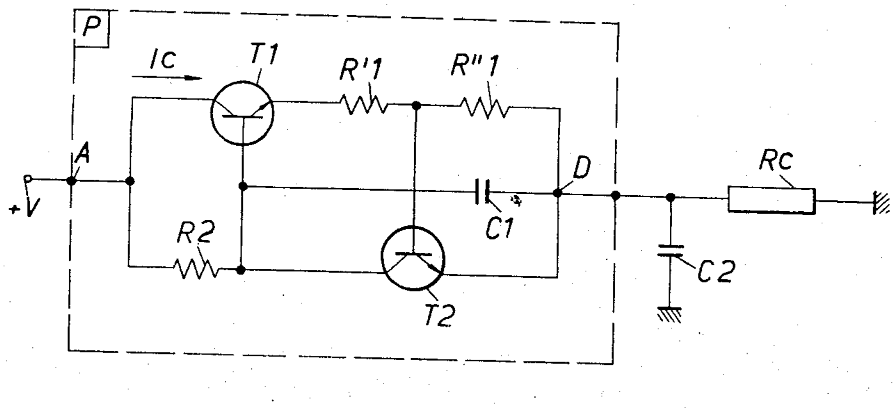
FIG. 1 illustrates the schematic diagram of the gyrator in accordance with the principles of the present invention.

FIG. 1 illustrates the circuit diagram of the supply dipole or current-limited gyrator P in accordance with the principles of the present invention used as an inductance in a low-pass filter which also includes the capacitor C2. The circuit, which comprises two terminals A and D, delivers the current consumed by a load impedance Rc from a voltage source +V.

The current-limited gyrator or dipole P comprises the PNP transistors T1, T2, the resistors R'1, R''1, R2 and the capacitor C1.

The TABLE hereunder gives the definitions and a set of typical values of the parameters *he* which will be used during the description, and also an example of values of the resistors in the dipole P.

TABLE

| | PARAMETERS | SYMBOL | Typical Value |
|---|---|---|---|
| Parameters of the Transistor T1 | Input impedance | hie | 900 ohms |
| | Reverse-transfer voltage ratio | hre | $5.10^{-4}$ |
| | Current gain | hfe | 120 |
| | Output admittance | hoe | $125.10^{-6}$ μohms |
| | Resistances of the Dipole P | R'1 | 80 ohms |
| | | R''1 | 20 ohms |
| | | R2 | 12 kilohms |

The D.C operation, the A.C operation and a particular application of the dipole P will be successively studied hereinbelow.

1. D.C. operation

In this study capacitor C1 is not taken into account and it will be first assumed that transistor T2 does not exist.

The D.C. current flowing through the transistor T1 is : $Ic = V/(r+Rc)$. In this equation $r = R1 + (R2+hie)/hfe$ with $R1 = R'1 + R''1$, and the emitter and collector currents of transistor T1 are equal because of the high value of *hfe* (see the TABLE).

The equivalent circuit of the dipole is therefore represented by a voltage source *V* of internal resistance *r* which supplies a load *Rc*.

With the values given in the TABLE $r \approx 200$ ohms, and with $V = 20$ volts, the short-circuit current of the generator (when $Rc = 0$) is 100 mA (milliamps).

Under these conditions the voltage drop across the terminals of *R*1 is 10 volts and the consumed power is 1 watt in transistor T1 and 1 watt in resistor *R*1.

Figure 2:
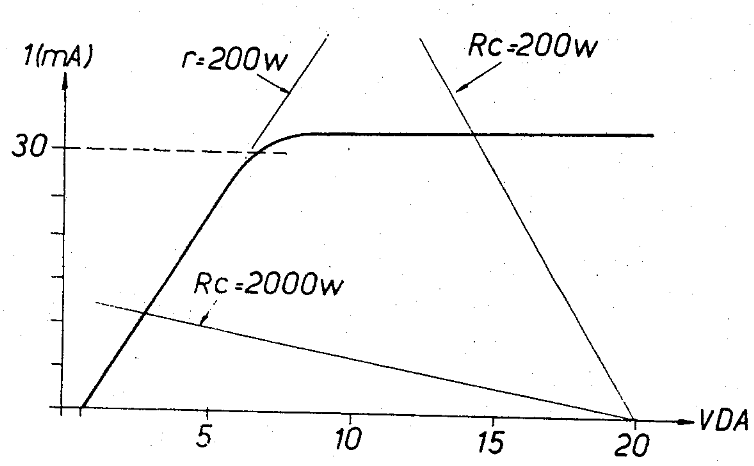
FIG. 2 illustrates the characteristic $Ic = f(VDA)$ of the gyrator of FIG. 1.

If now the transistor T2 is connected, it is blocked as long as $R''1.Ic<u$, *u* being the conduction threshold of transistor T2. When $R''1.Ic>u$, transistor T2 switches on and it diverts part of the current flowing through the resistor R2, so limiting the base current of transistor T1. A constant voltage difference *u* develops across the terminals of *R''*1 so that the current is limited to the value $u/R''1 = 30$ mA as can be seen in FIG. 2 which represents the characteristic $Ic = f(VDA)$, $VDA$ representing the voltage between the terminals D and A of the dipole P.

Under these conditions the voltage drop across the terminals of $R1$ is 3 volts, and the consumed power is 0.5 watt in transistor T1 and 0.1 watt in resistor $R1$. It can be seen that the total power dissipation in the dipole, when a short-cicuit occurs, has been reduced by a ratio higher than three.

In the circuit of FIG. 1, the set point for the current depends on the value of resistor $R1$. Nevertheless, it is possible to reduce the internal resistance $r$ of the dipole by replacing the transistor T1 by a Darlington configuration, hence, $r \approx R1 + R2/hfe^2 \approx R1$. Reciprocally, it is possible to increase internal resistance $r$ by making $R1$ and/or $R2$ higher.

The circuit which has been described is made by the connection in series of three components which are the voltage source $V$, the dipole P and the load $Rc$. It is clear that the order of these elements can be reversed without modifying its operation.

It is also possible to supply a circuit with a negative voltage source by using NPN transistors.

2. A.C. operation

To describe the A.C. operation of the gyrator circuit of FIG. 1 transistor T2 will not be taken into account, since it is off as long as $R1.\ Ic < u$ and equivalent diagrams will be employed in which transistor T1 will be represented by its $h$ parameters in common emitter configuration according to the above TABLE.

The equivalent inductance and the equivalent resistance of the gyrator will be successively computed at medium frequencies, measured between the points A and D.

2.1 Equivalent inductance

Figure 3:
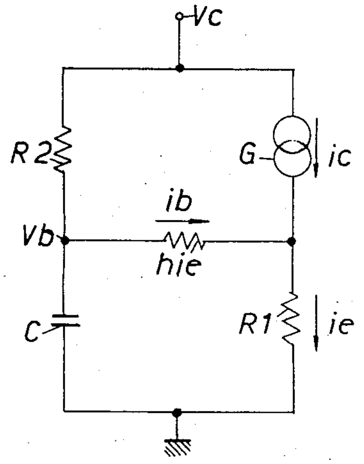
FIG. 3 illustrates the equivalent diagram of the gyrator of FIG. 1.

FIG. 3 represents the equivalent diagram of the gyrator of FIG. 1 employing the above assumptions and in which it is assumed that $hre = hoe = 0$.

Figure 4:
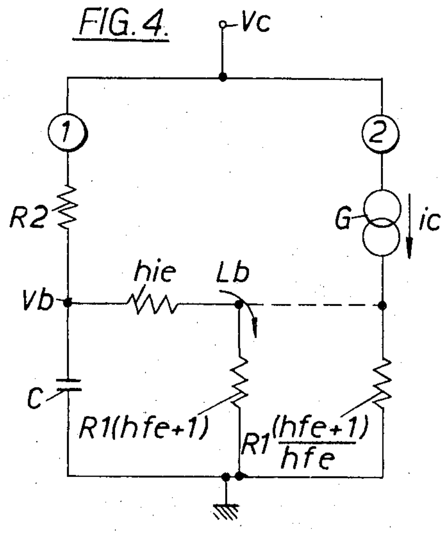
FIG. 4 illustrates an equivalent diagram of the gyrator of FIG. 1 employed for the calculation of the equivalent inductance.

FIG. 4 represents an equivalent diagram derived from FIG. 3 and in which the base circuit and the collector-emitter circuit has been separated into two branches, respectively labeled 1 and 2. It results that: (1) in the base circuit (branch 1), the base current is defined by the connection in series of the impedance $hie$ and of an impedance having a value $R1(hfe+1)$; and (2) in the collector-emitter circuit (branch 2), the resistor $R1$ is replaced by a resistor $R1(hfe+1/hfe)$.

Figure 5:
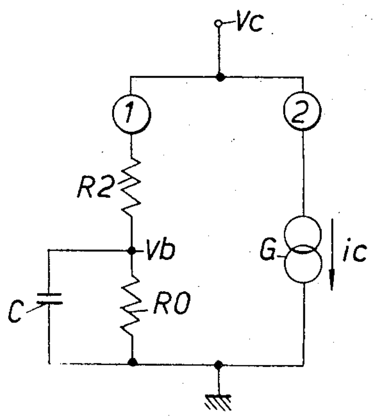
FIG. 5 illustrates a simplified equivalent diagram derived from that of FIG. 4.

Since the generator G is a current generator, its internal resistance is very high in comparison with the resistor $R1\ (hfe+1/hfe)$. Therefore, this latter resistance can be neglected which leads to the equivalent diagram of FIG. 5. Then the valuing values are obtained:

$X = -(1/C\omega)$ $Ra = R1(hfe+1) + hie$ $Zb = (Ro.jX)/(Ro+jX)$ $Zc = R2 + Zb.$ Moreover, if $Vc$ and $Vb$ are the A.C. voltages at the collector and the base of the transistor T1, respectively, the following relations can be written:

Current in the branch 1:

$$Vc/Zc = Vb/Zb \qquad (1)$$

Base current:

$$ib = Vb/Ro = ic/hfe \qquad (2)$$

By combining the equations (1) and (2) and by calling $Z$ the complex impedance of the branch 2, $Z$ is defined as follows:

$Z = Vc/ic = Vb/ic \cdot Zc/Zb = Ro/hfe \cdot Zc/Zb$ or $$Z = (Ro+R2)/hfe + R2/jX \cdot Ro/hfe = R' + jX' \qquad (3)$$

To find the value of the reactance X' the following may be written:

$jX' = R2/jX \cdot Ro/hfe$ or $X' = -R2/X) \cdot Ro/hfe = Ro.R2/hfe \cdot C\omega$ It will be seen that this reactive term is equivalent to an inductance of value:

$L = R2.\ [R1\ (hfe+1/hfe) + hie/hfe] \cdot C$

When referring to the typical values of the above TABLE, it is seen that the value of the term between the parenthesis is not very different from 1. Therefore, there is obtained:

$L = R2\ .\ [(R1 + (hie/hfe)]\ .\ C$

It will be seen that the equivalent inductance of the gyrator is practically independent of the transistor parameters. Actually, if there is obtained on one hand $R1 = 100$ ohms and on the other hand $hie/hfe \approx 7$ ohms (see typical values in the TABLE), the calculation shows that a variation of 10 percent of the ratio $hie/hfe$ produces only a variation of inductance of less than 1 percent.

2.2 Equivalent resistance at medium frequencies (1 to 100 kHz)

Figure 6:
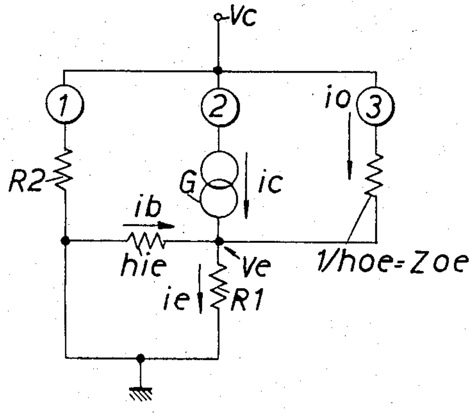
FIG. 6 illustrates an equivalent diagram of the gyrator of FIG. 1 employed for the calculation of the A.C resistance of the gyrator.

FIG. 6 represents an equivalent diagram of the gyrator according to the invention in which it has been assumed that:

$hre = 0$ $1/C\omega << R1$ $1/C\omega << R2$

If $Ve$ is the A.C voltage at the emitter of transistor T1, there is obtained:

$$ib = Ve/hie = ic/hfe \qquad (4)$$

The different currents which flow into the current node at the emitter of transistor T1 are: (1) the current which flows through the output admittance hoe, the value of which is: $io = (Vc-Ve).$ hoe; (2) the current delivered by the current generator G, namely, $ic = -(Ve.hfe/hie)$; (3) the base current $ib = -(Ve/hie)$; and (4) the current flowing across the emitter resistance, namely, $-ie = -(Ve/R1)$. The equation of the current node is : $io + ic + ib - ie = 0$, or:

$(Vc-Ve).\ hoe = Ve.hfe/hie + Ve/hie + Ve/R1$ $Vc-Ve = Ve\ [(hfe/hie) + (1/hie) + (1/R1)\ ]$ The equivalent impedance of the current generator G (branch 2, FIG. 6) is:

$$Zg = (Vc-Ve)/ic \qquad (5)$$

Equation (5) then becomes, by setting $ic = -(hfe)/hie)\ .\ Ve$ (equation 4), $$Zg = -1/hoe \cdot [(hfe+1)hie + (1/R1)]\ .\ hie/hfe = -1/hoe.hfe\ [1 + hfe + (hie/R)] \qquad (6)$$

It will be seen that $Zg$ is a negative impedance in parallel with the output impedance $Zoe = 1/hoe$ of the transistor (branch 3, FIG. 6). The equivalent resistance Z23 of the circuit constituted by the parallel connection of the branches 2 and 3 is:

$1/Z23 = 1/zoe + 1/Zg$

Equation (6) enables the computing of the value Z23 which is:

$$Z23 = 1/hoe\ [1 + (hfe/1 + hie/R1)] \qquad (7)$$

If the values of the parameters given in the above TABLE are employed, *R*1 = 100 ohms, Z23 becomes: Z23≈105 kilohms.

The equivalent resistance Z123 of the gyrator consists of the parallel connection of the resistor R2 (branch 1 of the circuit of FIG. 6) and of the impedance Z23 so that, for *R*2 = 12 kilohms:

Z123≈10 kilohms.

It will be noticed that, when the transistor T2 is conducting, the dipole still appears like an inductance.

It is understood that if the transistor T1 is replaced by a pair of transistors in a Darlington configuration with a current gain $hfe^2$: (1) the impedance Z23 (equation 7) is increased by an appreciable amount; and (2) the equivalent impedance Z123 is also increased, since the value of the resistor *R*2 is multiplied by ratio $hfe^2$.

3. Special application

Figure 7:
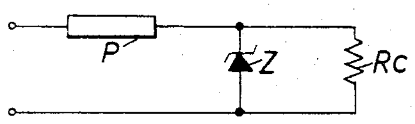
FIG. 7 illustrates the use of the gyrator of FIG. 1 with a Zener diode.

FIG. 7 illustrates the use of the dipole P, that has been described hereinabove, as the supply resistor of a Zener diode providing voltage stabilization across the terminals of a load resistor *Rc*.

For the D.C operation, the resistors of the dipole P are chosen so that it provides a correct operation in the range of currents admissible in the load Rc. If this current becomes larger than the preset value, the Zener diode is no more in its avalanche region and the dipole provides a constant current which it can completely dissipate, even when *Rc* = 0.

For the A.C operation, the circuit presents the same advantages as the series inductance input filter which has been described in relation with FIG. 1 and which provides a much better filtering than that obtained with a standard configuration of Zener diode with a supply resistor.

While we have described above the principles of our invention in connection with specific apparatus it is to be clearly understood that this description is made only by way of example and not as a limitation to the scope of our invention as set forth in the objects thereof and in the accompanying claims.

We claim:

1. A gyrator comprising:
a first terminal;
a second terminal;
a first transistor of a given type having a base, an emitter and a collector, said collector being directly connected to said first terminal;
a first resistor directly connected between said first terminal and said base of said first transistor;
a power supply source directly connected to said first terminal;
a second resistor directly connected to said emitter of said first transistor;
a third resistor directly connected in series between said second resistor and said second terminal;
a capacitor directly connected between said base of said first transistor and said second terminal;
a load circuit directly connected to said second terminal; and
a second transistor of a type equal to said given type being a base, an emitter and a collector, said base of said second transistor being directly connected to the junction between said second and third resistors, said emitter of said second transistor being directly connected to said second terminal and said collector of said second transistor being directly connected to said base of said first transistor.

* * * * *

UNITED STATES PATENT OFFICE

CERTIFICATE OF CORRECTION

Patent No. 3,778,734 Dated December 11, 1973

Inventor(s) Joel Serge Colardelle, Claude Paul Henri Lerouge, Marc Andre Regnier It is certified that error appears in the above-identified patent and that said Letters Patent are hereby corrected as shown below:

On the Front Page in Data Element Identifier [75] Inventors:

Cancel "Marc Andre Regbuer" and substitute therefor

--Marc Andre Regnier--.

Signed and sealed this 18th day of June 1974.

(SEAL)
Attest:

EDWARD M.FLETCHER,JR.
Attesting Officer

C. MARSHALL DANN
Commissioner of Patents